(12) United States Patent
Yang

(10) Patent No.: US 11,448,100 B1
(45) Date of Patent: Sep. 20, 2022

(54) COMBINED CYCLE UNIT STANDBY SYSTEM WITH INTEGRATED AUXILIARY GAS TURBINE GENERATOR

(71) Applicant: Jia Kai Energy Technology Co. Ltd., New Taipei (TW)

(72) Inventor: Wein-Joe Yang, New Taipei (TW)

(73) Assignee: Jia Kai Energy Technology Co. Ltd., New Taipei (TW)

( * ) Notice: Subject to any disclaimer, the term of this patent is extended or adjusted under 35 U.S.C. 154(b) by 0 days.

(21) Appl. No.: 17/671,298

(22) Filed: Feb. 14, 2022

(51) Int. Cl.
*F01K 23/10* (2006.01)
*F02C 6/04* (2006.01)

(52) U.S. Cl.
CPC .............. *F01K 23/101* (2013.01); *F02C 6/04* (2013.01)

(58) Field of Classification Search
CPC ................................. F01K 23/101; F02C 6/04
See application file for complete search history.

(56) References Cited

U.S. PATENT DOCUMENTS

| | | | | |
|---|---|---|---|---|
| 6,519,927 | B2* | 2/2003 | Liebig | F01K 23/10 60/39.182 |
| 8,061,002 | B2* | 11/2011 | Briesch | F02C 6/00 29/401.1 |
| 9,416,685 | B2* | 8/2016 | Sharp | F22B 1/1815 |
| 11,268,409 | B2* | 3/2022 | Cloyd | F01K 23/101 |
| 2005/0034445 | A1* | 2/2005 | Radovich | F01K 23/10 60/39.182 |
| 2011/0131989 | A1* | 6/2011 | Sampson | G05B 13/021 60/641.1 |
| 2013/0125525 | A1* | 5/2013 | Hein | F01K 23/10 60/659 |
| 2015/0192036 | A1* | 7/2015 | Sharp | F01K 23/10 60/39.182 |
| 2016/0273397 | A1* | 9/2016 | Ekanayake | F02C 6/08 |

* cited by examiner

*Primary Examiner* — Jesse S Bogue
(74) *Attorney, Agent, or Firm* — Rabin & Berdo, P.C.

(57) ABSTRACT

Provided is a combined cycle (CC) unit standby system with integrated auxiliary gas turbine generator (Aux. GT), including: a plurality of first gas turbines, a plurality of heat recovery boilers, a steam turbine, a condenser, at least a second gas turbine generator and a control unit. As such, the present invention incorporates at least a second gas turbine generator of small capacity into the CC unit standby system, the pipelines and components of each unit are kept in a hot state, to facilitate the rapid load increase during restart process, to save energy during the standby period, accelerate the restart process and reduce the energy consumption during the starting phase, and also keep the unit in "House Load Operation" state, stay independent from the power grid to cope with the emergency situation of black start, improve the restart and energy efficiency in standby and shutdown states.

3 Claims, 2 Drawing Sheets

COMBINED CYCLE UNIT STANDBY SYSTEM WITH INTEGRATED AUXILIARY GAS TURBINE GENERATOR

BACKGROUND OF THE INVENTION

1. Field of the Invention

The present invention relates generally to a combined cycle unit (CC Unit) standby system of, and more particularly, to a CC Unit standby system with integrated auxiliary gas turbine generator (Aux. GT), able to restart quickly and save energy.

2. The Prior Arts

Referring to FIG. 1, FIG. 1 is a schematic view of a standby system of a conventional gas turbine CC Unit. As shown in FIG. 1, the conventional gas turbine CC unit standby system includes a plurality of first gas turbine generators 10A, a plurality of heat recovery boilers 20A, a steam turbine 30A, a condenser 40A and a control unit (not shown). Each of the plurality of the first gas turbine generators 10A respectively has a first input pipe 11A, a second input pipe 12A and a first output pipe 13A; each of the heat recovery boilers 20A is respectively connected to the first output pipes 13A, and each recovery boiler 20A includes a plurality of heating pipe rows 203A, a steam drum 201A, a steam header 202A and a chimney 204A, and has a second output pipe 21A and a third output pipe 22A; the steam turbine 30A has a third input pipe 31A and a fourth output pipe 32A, the fourth output pipe 32A is connected to the condenser 40A.

For power plants, steam power plants, chemical plants, incineration plants, etc. that often start, stand by, and shut down, in general in a long-duration standby conditions, such as overnight standby of about 8 hours or weekend standby of about 48 hours, the main equipment, for example, the first gas turbine generators 10A, the steam turbine 30A, the heat recovery boilers 20A, etc., will stop running, the auxiliary power required for the standby gas turbine CC unit will be reversely powered by the power grid, and the auxiliary steam will be supplied by an auxiliary boiler (Aux. boiler) or an auxiliary steam header adjacent to the gas turbine CC unit. Under such condition, as shown in FIG. 1, the heat recovery boiler 20A (HRSG) has no high-temperature flue gas entering and the main equipment and system will not be in operation. All related large-scale components, such as the steam drum 201A, the second output pipe 21A, and the steam turbine 30A, etc., will gradually cool down during standby. To deal with this cool-down effect, when the gas turbine CC unit restarts the next day or the next Monday, due to the thermal stress caused by the difference between the temperature of the steam and the components, the system must go through a slow heating process of the pipeline and components to reach the temperature matching to allow rapid load increase. The start-up process is often time-consuming and energy wasting.

To maintain standing-by of CC unit, auxiliary steam will be required. Normally, such auxiliary steam can be supplied from the adjacent connected steam header to the standing-by gas turbine CC unit. However, the said auxiliary steam temperature is not enough to maintain the temperature of the main pipelines and large-scale components. Usually, the auxiliary steam is only used for the shaft seal steam and the miscellaneous heating as required to maintain the vacuum of the steam turbine 30A and condenser 40A.

The effect of the slow start process in standby mode is not only a slow response to the demand of the power grid but also causing energy waste. Taking the new CC unit of the Tong-Hsiao Power Plant in Taiwan as an example, the hot start-up process (after 8 hours shut-down) takes about 90 minutes from ignition to full load; the warm start-up takes about 240 minutes, and the cold start-up takes up to 8 hours. During the start-up process, the gas turbine CC unit is running at partial load, and the thermal efficiency is much lower than the full load condition, resulting in serious energy waste, especially for gas-fired units used in medium and peak loads. With the increasing proportion of green energy in many countries/areas in the future, daily standby-and-restart will become more frequent. For the 25-year economic life of the generator sets, for example, ineffective energy consumption will be tremendous.

For some power plants, steam power plants, chemical plants, incineration plants and other units, based on the consideration of rapid restart after standby, the main equipment, such as the first gas turbine generators 10A, the steam turbine 30A, the heat recovery boiler 20A, etc., operates at a low load, such as about 5-50%, to maintain the temperature of the components and provide auxiliary power and auxiliary steam for the standby of the gas turbine CC unit. Although this type of operation mode can maintain the gas turbine CC unit in a high-temperature status, which is conducive for restarting the next day, the thermal efficiency is much lower than that of full-load operation during the low-load standby period, which will consume a large amount of energy during the standby period. Moreover, when the first gas turbine 10A operates at a low load, the operating hours of the gas turbine hot gas parts are consumed, and the gas turbine CC unit tends to be in a state of unstable control, which is detrimental to the safety of the power supply system. Therefore, how to improve the energy consumption, restart efficiency, and reduce the time duration for each start-up of the gas turbine CC unit during standby and/or start-up is the problem to be overcome by the present invention.

In view of the aforementioned, how to eliminate the deficiencies is the technical difficulty that needs to be solved; therefore, the invention is made to come into being to improve the efficacy.

SUMMARY OF THE INVENTION

A primary objective of the present invention is to provide a combined cycle (CC) unit standby system with integrated auxiliary gas turbine generator (Aux. GT), which is able to restart quickly and save energy.

In order to achieve the foregoing objective, the present invention provides a combined cycle (CC) unit standby system with integrated auxiliary gas turbine generator (Aux. GT), comprising: a plurality of first gas turbine generators, a plurality of heat recovery boilers, a steam turbine, a condenser, at least a second gas turbine and a control unit.

Each of the plurality of the first gas turbine generators respectively has a first input pipe, a second input pipe, and a first output pipe, the first output pipe is connected to a first connecting pipe, and the first connecting pipe is disposed with a second vale.

The plurality of heat recovery boilers are respectively connected with the first output pipes, and each heat recovery boiler includes a plurality of heating pipe rows, a steam drum, a steam header, and a chimney, and has a fourth input pipe, a second output pipe, and a third output pipe, the fourth input pipe is installed with a first valve and is connected with a second connecting pipe, and the second connecting pipe is installed with a third valve.

The steam turbine has a third input pipe and a fourth output pipe, and the third input pipe is connected to the second output pipes.

The condenser is connected to the fourth output pipe.

The at least one second gas turbine generator has a fifth output pipe, and the fifth output pipe is connected to the fourth input pipes, and the capacity of the at least one second gas turbine generator is approximately 0.5~30% of that of each first gas turbine generator.

The control unit is electrically connected to the first gas turbine generators, the steam turbine, the condenser, and the at least one second gas turbine generator.

Wherein, when at least one of the first gas turbine generators enters a shutdown state, the control unit starts the at least one second gas turbine generator and opens the first valves on the fourth input pipes, a high-temperature flue gas at an outlet of the at least one second gas turbine generator enters each heat recovery boiler through the fourth input pipe, and each steam drum, each steam header and other components of the heat recovery boiler are heated by high-temperature water produced by the flue gas heating each heating pipe row to maintain the components of each heat recovery boiler in a high temperature state.

Wherein, the steam generated by the heat recovery boiler flows to each second output pipe through each steam header, and then flows from each second output pipe to the third input pipe, and finally enters the interior of the steam turbine from the third input pipe, so as to drive impeller of the steam turbine to drive a generator of the steam turbine to generate electricity.

Wherein, the high temperature steam generated by each heat recovery boiler passes through the second output pipe, the third input pipe and the steam turbine to maintain the temperature of the second output pipe and each component of the steam turbine.

Wherein, each or the plurality of first gas turbine generators are provided with one or more second gas turbine generators.

Wherein, the outlet steam of the steam turbine flows to the condenser through the fourth output pipe, and the outlet of the steam turbine is maintained vacuum by the condensation of the steam.

Wherein, due to the heating of the high temperature flue gas at the outlet of the at least one second gas turbine generator, each component of each heat recovery boiler, each component of the steam turbine, the second output pipe, and the third input pipe all maintain high temperature; when at least one of the first gas turbine generators is restarted, the time required for the CC unit to progress from start-up ignition to full load is reduced, and the combustion efficiency during the start of the CC unit is improved.

Preferably, in the standby process, after the outlet flue gas of the at least one second gas turbine generator in operation entering each heat recovery boiler through the second connecting pipe and the fourth input pipe, in order to prevent the outlet flue gas from flowing back to the first output pipe then entering a body of each first gas turbine generator, plant air or instrument compressed air is injected into the fifth input pipe to fill the space of the first output pipe to prevent the backflow of flue gas.

Preferably, when each first gas turbine generator is operating, after the outlet flue gas of each first gas turbine generator in operation entering each heat recovery boiler through the first output pipe, in order to prevent the outlet flue gas from flowing back to the fourth input pipe then entering a body of the at least one second gas turbine generator through the fifth output pipe, plant air or instrument compressed air is injected into the fifth input pipe to fill spaces of the second connecting pipe and the fourth input pipe, and close the first valve to prevent the backflow of flue gas.

The effect of the present invention counts on that the present invention incorporates at least a second gas turbine generator of small capacity, i.e., an auxiliary gas turbine generator (Aux. GT), into the CC unit standby system, the pipelines and components of each unit are kept in a hot state, so as to facilitate the rapid increase in load during restart process, which can save energy during the standby period, speed up the restart process and reduce the energy consumption during the starting phase, and also keep the unit in "House Load Operation" state, stay independent from the power grid to cope with the emergency situation of black start, improve the restart and energy efficiency in standby and shutdown of power plants, steam power plants, chemical plants, incineration plants, etc.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
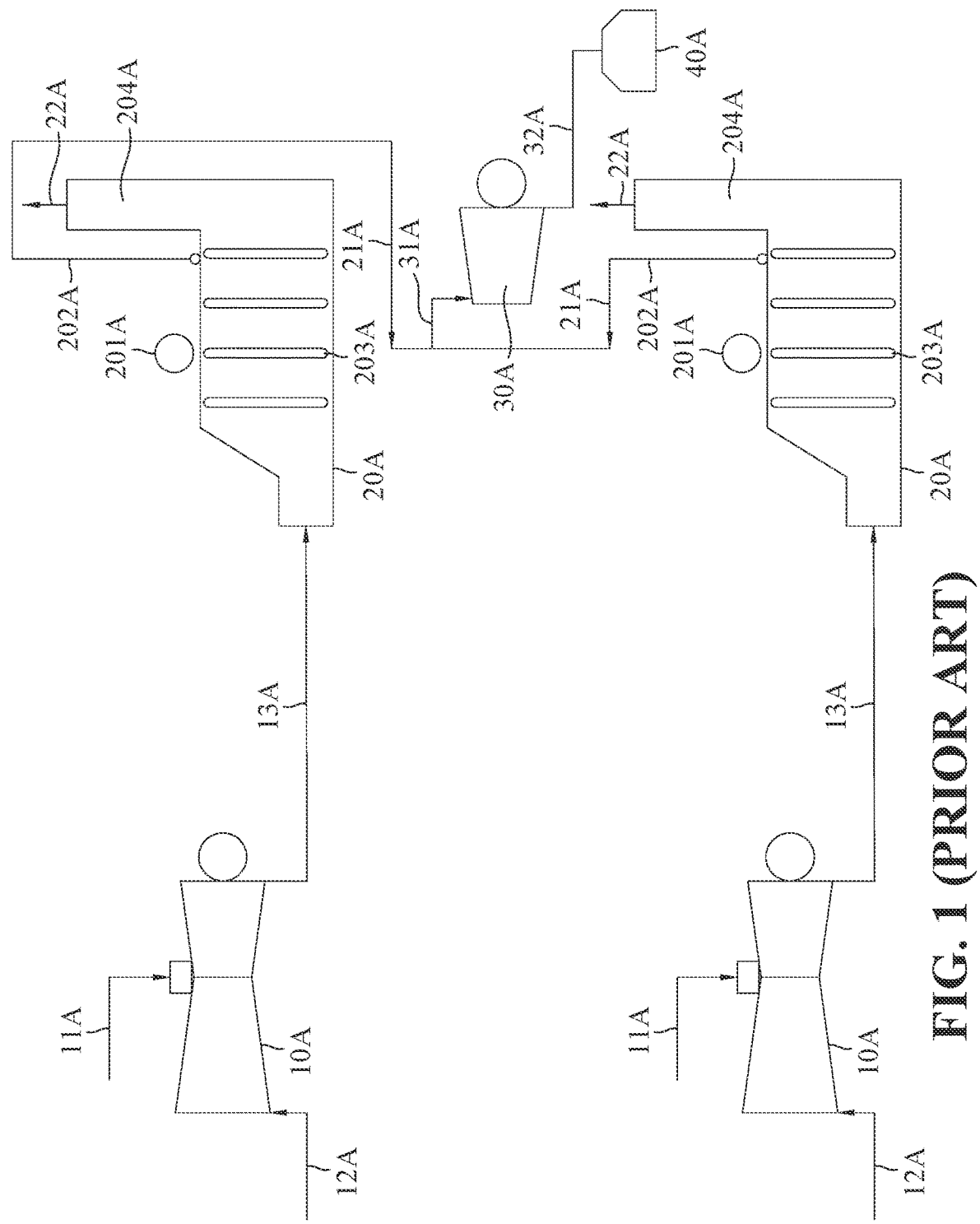
FIG. 1 is a schematic view illustrating a conventional combined cycle (CC) unit standby system.
Figure 2:
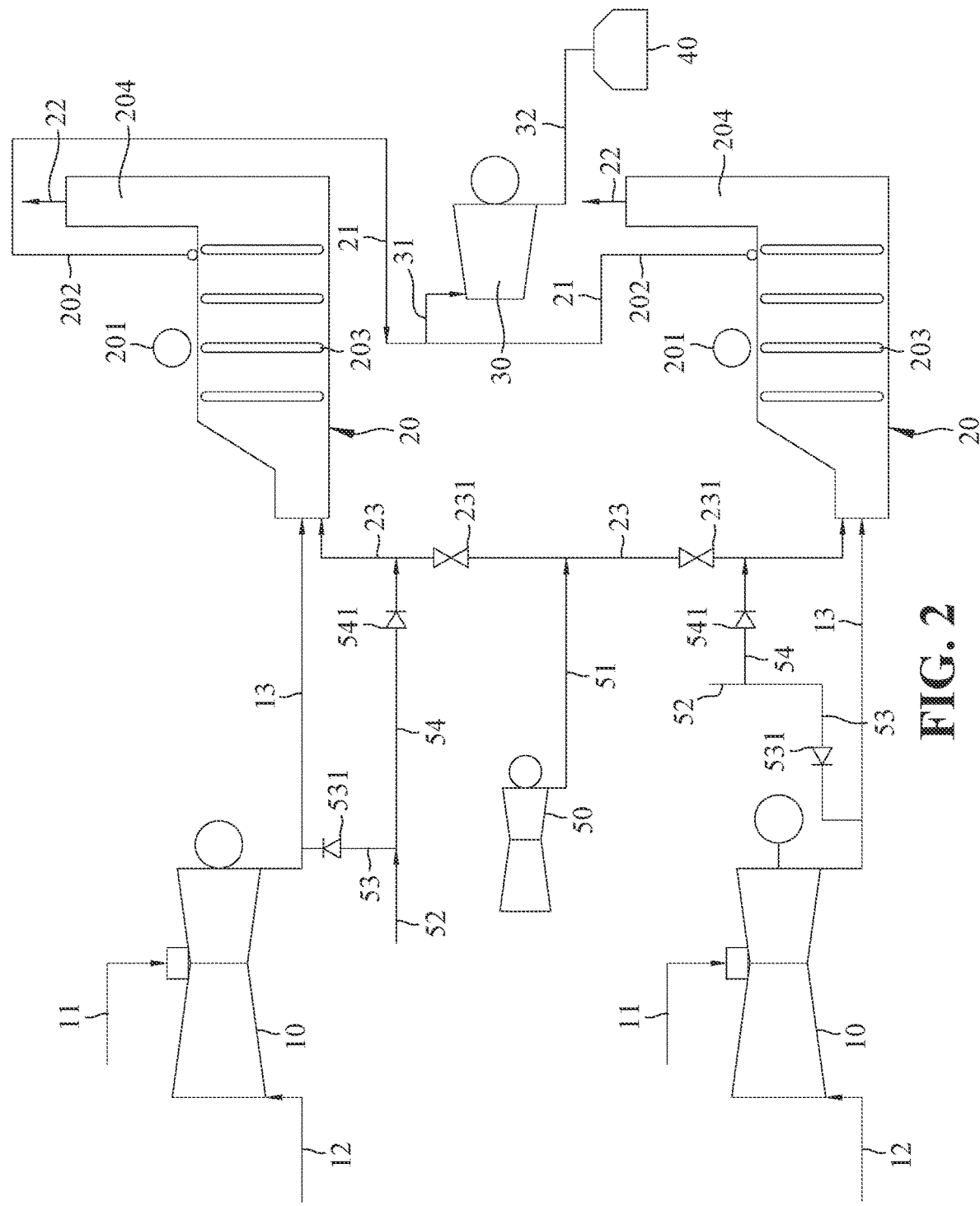
FIG. 2 is a schematic view of the CC unit standby system with integrated auxiliary gas turbine generator (Aux. GT) according to an embodiment of the present invention.

Referring to FIG. 2, FIG. 2 is a schematic view of the CC unit standby system with integrated auxiliary gas turbine generator (Aux. GT) according to an embodiment of the present invention. As shown in FIG. 2, the present invention provides a combined cycle (CC) unit standby system with integrated auxiliary gas turbine generator (Aux. GT), comprising: a plurality of first gas turbine generators 10, a plurality of heat recovery boilers 20, a steam turbine 30, a condenser 40, at least a second gas turbine generator 50, and a control unit (not shown).

Each of the plurality of first gas turbine generators 10 respectively has a first input pipe 11, a second input pipe 12, and a first output pipe 13, the first output pipe 13 is connected to a first connecting pipe 53, and the first connecting pipe 53 is installed with a second valve 531. The second valve 531 is a check valve.

The plurality of heat recovery boilers 20 are respectively connected with the first output pipes 13, and each heat recovery boiler 20 includes a plurality of heating pipe rows 203, a steam drum 201, a steam header 202, and a chimney 204, and has a fourth input pipe 23, a second output pipe 21, and a third output pipe 22, the fourth input pipe 23 is installed with a first valve 231 and is connected with a second connecting pipe 54, and the second connecting pipe 54 is installed with a third valve 541. Preferably, the second output pipe 21 is a main steam pipe, the first valve 231 is a shut-off valve, and the third valve 541 is a check valve.

The steam turbine 30 has a third input pipe 31 and a fourth output pipe 32, and the third input pipe 31 is connected to the second output pipes 21. Preferably, the third input pipe 31 is the main steam header.

The condenser 40 is connected to the fourth output pipe 32.

The at least one second gas turbine generator 50 has a fifth output pipe 51, and the fifth output pipe 51 is connected to the fourth input pipes 23, and the capacity of the at least one second gas turbine generator 50 is approximately 0.530% of that of each first gas turbine generator 10, depending on the application. The second gas turbine generator 50 is the aforementioned auxiliary gas turbine generator (Aux. GT).

The control unit is electrically connected to the first gas turbine generators 10, the steam turbine 30, the condenser 40, and the at least one second gas turbine generator 50.

When at least one of the first gas turbine generators 10 enters a shutdown state, the control unit starts the at least one second gas turbine generator 50 and opens the first valves 231 on the fourth input pipes 23, a high-temperature flue gas at an outlet of the at least one second gas turbine generator 50 enters each heat recovery boiler 20 through the fourth input pipe 23, and each steam drum 201, each steam header 202 and other components of the heat recovery boiler 20 are heated by high-temperature water produced by the flue gas heating each heating pipe row 203 to maintain the components of each heat recovery boiler 20 in a high temperature state. The steam generated by the heat recovery boiler 20 flows to each second output pipe 21 through each steam header 202, and then flows from each second output pipe 21 to the third input pipe 31, and finally enters the interior of the steam turbine 30 from the third input pipe 31, so as to drive impeller (not shown) of the steam turbine 30 to drive a generator (not shown) of the steam turbine 30 to generate electricity. The high temperature steam generated by each heat recovery boiler 20 passes through the second output pipe 21, the third input pipe 31 and the steam turbine 30 to maintain the temperature of the second output pipe 21 and each component of the steam turbine 30. Wherein, the outlet steam of the steam turbine 30 flows to the condenser 40 through the fourth output pipe 32, and the outlet of the steam turbine 30 is maintained vacuum by the condensation of the steam. Due to the heating of the high temperature flue gas at the outlet of the at least one second gas turbine generator 50, each component of each heat recovery boiler 20, each component of the steam turbine 30, the second output pipe 21, and the third input pipe 31 all maintain high temperature; when at least one of the first gas turbine generators 10 is restarted, the time required for the CC unit to progress from start-up ignition to full load is reduced, and the combustion efficiency during the start of the CC unit is improved.

Preferably, in the standby process, after the outlet flue gas of the at least one second gas turbine generator 50 in operation entering each heat recovery boiler 20 through the second connecting pipe 54 and the fourth input pipe 23, in order to prevent the outlet flue gas from flowing back to the first output pipe 13 then entering a body of each first gas turbine generator 10, plant air or instrument compressed air is injected into the fifth input pipe 52 to fill the space of the first output pipe 13 to prevent the backflow of flue gas.

Preferably, when each first gas turbine generator is operating, after the outlet flue gas of each first gas turbine generator 10 in operation entering each heat recovery boiler 20 through the first output pipe 13, in order to prevent the outlet flue gas from flowing back to the fourth input pipe 23 then entering a body of the at least one second gas turbine generator 50 through the fifth output pipe 51, plant air or instrument compressed air is injected into the fifth input pipe 52 to fill spaces of the second connecting pipe 54 and the fourth input pipe 23, and close the first valve 231 to prevent the backflow of flue gas.

In other embodiments, the combined cycle turbine (CC unit) standby system with integrated auxiliary gas turbine generator (Aux. GT) of the present invention includes a plurality of second gas turbine generators 50. The plurality of fifth output pipes 51 of the second gas turbine generators 50 are all connected to the fourth input pipes 23. During operation, each first gas turbine generator 10 can work together with a second gas turbine generator 50; or, each first gas turbine generator 10 can work together with the plurality of second gas turbine generators 50.

In summary, the present invention incorporates at least a second gas turbine generator of small capacity, i.e., an auxiliary gas turbine generator (Aux. GT), into the CC unit standby system, the pipelines and components of each unit are kept in a hot state, so as to facilitate the rapid increase in load during restart process, which can save energy during the standby period, speed up the restart process and reduce the energy consumption during the starting phase, and also keep the unit in "House Load Operation" state, stay independent from the power grid to cope with the emergency situation of black start, improve the restart and energy efficiency in standby and shutdown of power plants, steam power plants, chemical plants, incineration plants, etc.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A combined cycle (CC) unit standby system with integrated auxiliary gas turbine generator (Aux. GT), comprising:
   a plurality of first gas turbine generators, each of the plurality of the first gas turbine generators respectively having a first input pipe, a second input pipe, and a first output pipe, the first output pipe being connected to a first connecting pipe, and the first connecting pipe being installed with a second valve;
   a plurality of heat recovery boilers, the plurality of heat recovery boilers being respectively connected with the first output pipes, and each heat recovery boiler comprising a plurality of heating pipe rows, a steam drum, a steam header, and a chimney, and has a fourth input pipe, a second output pipe, and a third output pipe, the fourth input pipe being installed with a first valve and connected with a second connecting pipe, and the second connecting pipe being installed with a third valve;
   a steam turbine, the steam turbine having a third input pipe and a fourth output pipe, and the third input pipe being connected to the second output pipes;
   a condenser, connected to the fourth output pipe;
   at least a second gas turbine generator, having a fifth output pipe, and the fifth output pipe being connected to the fourth input pipes, and the capacity of the at least one second gas turbine generator being approximately 0.5~30%, of that of each first gas turbine generator; and a control unit, electrically connected to the first gas turbine generators, the steam turbine, the condenser, and the at least one second gas turbine generator;

wherein when at least one of the first gas turbine generators enters a shutdown state, the control unit starts the at least one second gas turbine generator and opens the first valves on the fourth input pipes, a high-temperature flue gas at an outlet of the at least one second gas turbine generator enters each heat recovery boiler through the fourth input pipe, and each steam drum, each steam header and other components of the heat recovery boiler are heated by high-temperature water produced by the flue gas heating each heating pipe row to maintain the components of each heat recovery boiler in a high temperature state;

the steam generated by the heat recovery boiler flows to each second output pipe through each steam header, and then flows from each second output pipe to the third input pipe, and finally enters the interior of the steam turbine from the third input pipe, so as to drive impeller of the steam turbine to drive a generator of the steam turbine to generate electricity;

the high temperature steam generated by each heat recovery boiler passes through the second output pipe, the third input pipe and the steam turbine to maintain the temperature of the second output pipe and each component of the steam turbine;

each or the plurality of first gas turbine generators are provided with one or more second gas turbine generators;

the outlet steam of the steam turbine flows to the condenser through the fourth output pipe, and the outlet of the steam turbine is maintained vacuum by the condensation of the steam;

due to the heating of the high temperature flue gas at the outlet of the at least one second gas turbine generator, each component of each heat recovery boiler, each component of the steam turbine, the second output pipe, and the third input pipe all maintain high temperature; when at least one of the first gas turbine generators is restarted, the time required for the CC unit to progress from start-up ignition to full load is reduced, and the combustion efficiency during the start of the CC unit is improved.

2. The combined cycle unit standby system with integrated auxiliary gas turbine generator according to claim 1, wherein in the standby process, after the outlet flue gas of the at least one second gas turbine generator in operation entering each heat recovery boiler through the second connecting pipe and the fourth input pipe, in order to prevent the outlet flue gas from flowing back to the first output pipe then entering a body of each first gas turbine generator, plant air or instrument compressed air is injected into the fifth input pipe to fill the space of the first output pipe to prevent the backflow of flue gas.

3. The combined cycle unit standby system with integrated auxiliary gas turbine generator according to claim 1, wherein when each first gas turbine generator is operating, after the outlet flue gas of each first gas turbine generator in operation entering each heat recovery boiler through the first output pipe, in order to prevent the outlet flue gas from flowing back to the fourth input pipe then entering a body of the at least one second gas turbine generator through the fifth output pipe, plant air or instrument compressed air is injected into the fifth input pipe to fill spaces of the second connecting pipe and the fourth input pipe, and close the first valve to prevent the backflow of flue gas.

* * * * *